UNITED STATES PATENT OFFICE.

WALTER O. SNELLING, OF PITTSBURGH, PENNSYLVANIA.

FERTILIZING METHOD AND MATERIAL.

1,274,343.  Specification of Letters Patent.  Patented July 30, 1918.

No Drawing.  Application filed April 17, 1915.  Serial No. 22,005.

*To all whom it may concern:*

Be it known that I, WALTER O. SNELLING, a citizen of the United States, and a resident of Pittsburgh, in the county of Allegheny and State of Pennsylvania, have invented a new and useful Improvement in Fertilizing Methods and Materials, of which the following is a specification.

My invention relates to the fertilizing and conditioning of soils, and it has special reference to the use of explosives for the purpose of distributing fertilizing agents and improving their effects.

One object of my invention is to provide a novel and effective method of treating agricultural soils to improve their physical structure and to increase their store of available plant food.

Another object of my invention is to provide a new and improved class of explosives for agricultural use that shall act to loosen the soil and to simultaneously distribute fertilizing materials therein.

My invention is based upon the principle that a charge of explosive, containing a fertilizer in addition to the ingredients necessary for explosive action, may be fired underground, and will then serve not only to loosen the soil but also to thoroughly distribute the associated fertilizing material in the loosened earth throughout a considerable radius, where it will be available to growing plants.

The use of explosives in agriculture and horticulture is well known, particularly for the purpose of mellowing and softening the soil preparatory to planting fruit trees, and it is found that trees planted in ground that has been broken up by firing charges of dynamite, blasting powder and the like will grow more quickly and develop in a more healthy manner than trees planted in the usual way. Such improved growth of trees and plants in blasted earth is due to the thoroughness with which a properly discharged explosive breaks up the soil particles through a wide radius, which gives the delicate rootlets of the growing plants a better opportunity to spread out through the minute spaces and fissures in the earth and to reach the supplies of plant food set free by the shattering effect of the explosion.

According to my present invention, I greatly increase the beneficial effects of agricultural explosives by adding soil-fertilizing ingredients to them, the fertilizers being driven by the explosive action for considerable distances through the loosened earth. The fertilizing material may be present in the explosive charge either as an added ingredient, inert as far as the explosive reactions are concerned; or it may constitute an excess of one or more of the explosive ingredients. Among the explosively inert fertilizers that are suitable for my purpose are the mono-calcium, di-calcium and tri-calcium phosphates, calcium cyanamid (lime nitrogen), gypsum, non-oxidizing potassium compounds and organic products rich in nitrogen, such as guano, dried tankage and the like. To the class of fertilizers which themselves take part in the explosion to a greater or less degree belong the nitrates, particularly potassium nitrate, ammonium salts and compounds which decompose with evolution of ammonia or ammonium compounds.

I am aware that potassium salts, ammonium salts and nitrates all enter into the normal composition of many explosives, but I believe that I am the first to make use of agricultural explosives containing an excess of such substances, beyond the amounts required for explosive action, for the purpose of fertilizing the soil at the time of explosion. It is further to be noted that the nitrogen present in the nitrates of ordinary explosives is, upon explosion, converted into the form of free nitrogen, and thus is lost as far as any fertilizing effect is concerned. Accordingly, it is only when nitrates are present in excess of the amount required for the normal action of the explosive that there remains sufficient nitrate material, after explosion, to be of any advantage to plant growth.

The distribution of fertilizer according to my invention can take place in at least two distinct ways. If particles of an explosively inert fertilizer, such as a phosphate, are contained within the explosive charge, or in a surrounding envelop, these particles will be driven mechanically by the force of the explosion through the cracks and interstices produced by the explosion, and the liberated gases will also assist in mechanically distributing the particles of fertilizer. If, however, the explosive contains an excess of a decomposable compound, ammonium nitrate, for example, an entirely different effect will be produced. The intense heat of the explosion will tend to dissociate the ammonium nitrate, and the dissociated products will be carried as gases through the soil, along with the other explosion gases. Later, the ammonia and the oxids of nitrogen will tend to recombine and neutralize each other within the soil, and the ammonia may also be fixed by combination with acids present in the ground. Both of the foregoing effects are produced, of course, when both decomposable and inert fertilizers are present in the same explosive charge.

The kinds and amounts of the fertilizers to be used will be governed by the requirements of the plants or trees to be planted and the chemical composition and structure of the soil. The following illustrative examples describe charges which I have found to be suitable, and will indicate the general procedure to be followed.

For orchard purposes, in preparing the soil for planting new trees or revitalizing old orchards, a finely-ground phosphate material may be mixed with the ordinary ingredients of blasting powder, together with an excess of saltpeter or other nitrate. The mixture is made up in the usual manner into sticks or cartridges, which are fired in small holes bored in the soil from one to three feet deep. The charge should be well tamped, in order that most of the shattering force of the explosion may be exerted laterally.

In a modified form of cartridge, I inclose an ordinary stick or cartridge of any desired explosive in an envelop or outer wrapping containing finely-ground fertilizer, which surrounds the explosive cartridge and is held in place by the outer envelop. When the explosive charge is fired, the contents of the outer envelop are driven into the softened soil to a considerable distance from the point of explosion, and the fertilizing materials are left exactly at the points where fertilizer is most useful to the plants. This form of cartridge may be modified by applying the fertilizer around the stick of explosive by means of a binder. I prefer, however, to employ the fertilizer in dry, finely-divided form, and to inclose the whole cartridge in an envelop of paper or similar material.

My invention has other applications in addition to the distribution of plant food in the soil. For example, the inoculation of soils with nitrogen-fixing bacteria, or with other micro-organisms that are helpful to plant growth, may be readily accomplished by placing small amounts of earth or other suitable carrier or culture medium, charged with the desired micro-organisms, in connection with explosive charges and exploding such charges at suitable intervals beneath the surface of the fields to be inoculated.

The distribution of these valuable adjuncts through the soil is greatly facilitated by this procedure, such treatment being of great value where it is desired to inoculate the soil with nitrifying bacteria for growing leguminous plants such as alfalfa, soy beans, clover, vetches and the like. Although the heat of explosion is intense, it is of very short duration, and I have found experimentally that earth or any other suitable culture medium, inoculated with nitrogen-fixing bacteria is not sterilized by the explosion.

A further application of my invention is in the fertilization of fields for growing general agricultural crops. When ordinary fertilizers are scattered upon earth according to the methods now in general use, considerable portions of the soluble salts in the fertilizers are carried off by the first rainfall, in the run-off from the field, and are therefore lost in the streams without benefiting the soil. My method of explosively distributing fertilizers makes it possible to distribute even the most soluble fertilizing materials beneath the surface of the soil in such a manner that, being intimately mixed with earth, they are dissolved only by percolating ground waters, and are therefore available as plant food for a long time. It is still better, for general fertilizing purposes, to employ a rather insoluble fertilizer, or a balanced mixture of insoluble fertilizers, which, when mixed with the loosened subsoil by my method, will greatly increase the vitality of the soil.

In treating a field according to the method just described, I prefer to bore holes from one to three feet deep at intervals of eight or ten yards, either in square or quincunx arrangement. Each of these holes should be only wide enough to receive an explosive-fertilizer cartridge, which should be placed at the bottom of the hole, provided with the usual detonating cap and fuse, well tamped with earth and fired. A thorough treatment in this manner will renew the vitality of the soil for many years, breaking up the subsoil more effectively than can be done by the deepest subsoil plowing, as well as distributing the fertilizers associated with the explosive.

It is obvious that my invention is capable of a wide variety of modifications, both in the materials used and in the methods of employing them, and it is therefore to be understood that my invention is not restricted to the specific substances and methods set forth above, and that it is limited only by the scope of the appended claims.

I claim as my invention:

1. The method of fertilizing soils that comprises distributing fertilizing material therein by explosive means.

2. The method of fertilizing soil that comprises exploding in the soil a charge of explosive material associated with a body of fertilizing material.

3. The method of fertilizing soil that comprises exploding in the soil a charge of an explosive material associated with a body of solid, finely-divided fertilizing material.

4. The method of fertilizing soil that comprises exploding in the soil a charge of an explosive material associated with a body of solid, finely-divided and relatively insoluble fertilizing material.

5. An explosive for agricultural use comprising explosive material associated with fertilizing material that takes no part in the explosive reaction but is adapted to be scattered in a chemically unchanged condition when the explosive is fired.

6. An explosive for agricultural use comprising explosive material and a calcium phosphate.

7. An explosive cartridge for agricultural use comprising a body of explosive surrounded by a fertilizing material, and means for maintaining the said materials in the said relation.

8. An explosive cartridge for agricultural use comprising a body of explosive surrounded by a fertilizing material, and an outer envelop inclosing the said fertilizing material.

9. An explosive cartridge for agricultural use comprising a body of explosive surrounded by a solid, finely divided fertilizing material, and an outer envelop surrounding the said fertilizing material.

In testimony whereof I have hereunto subscribed my name this 15th day of April, 1915.

WALTER O. SNELLING.

Witnesses:
M. R. McKeown,
J. G. Kaiser.